(12) United States Patent
Davis

(10) Patent No.: US 8,671,165 B2
(45) Date of Patent: Mar. 11, 2014

(54) METHOD, CELL PHONE AND SYSTEM FOR ACCESSING A COMPUTER RESOURCE OVER A NETWORK VIA MICROPHONE-CAPTURED AUDIO

(71) Applicant: Digimarc Corporation, Beaverton, OR (US)

(72) Inventor: Bruce L. Davis, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 13/887,572

(22) Filed: May 6, 2013

(65) Prior Publication Data

US 2013/0237194 A1     Sep. 12, 2013

Related U.S. Application Data

(63) Continuation of application No. 13/856,161, filed on Apr. 3, 2013, which is a continuation of application No. 11/382,427, filed on May 9, 2006, now Pat. No. 8,417,793, which is a continuation of application No. 09/697,780, filed on Oct. 26, 2000, now abandoned.

(51) Int. Cl.
*G06F 15/16* (2006.01)

(52) U.S. Cl.
USPC .............. 709/219; 709/203; 705/52; 705/53; 455/550.1

(58) Field of Classification Search
CPC .......... H04I 67/00; H04L 67/02; H04W 4/24; H04W 4/26
USPC ............ 709/219, 203, 217, 225, 229; 705/52, 705/53; 455/550.1
See application file for complete search history.

(56) References Cited

U.S. PATENT DOCUMENTS

| 5,862,260 A | 1/1999 | Rhoads |
| 5,918,223 A | 6/1999 | Blum et al. |
| 5,963,957 A | 10/1999 | Hoffberg |
| 5,991,737 A | 11/1999 | Chen |
| 5,995,105 A | 11/1999 | Reber et al. |

(Continued)

FOREIGN PATENT DOCUMENTS

| EP | 1307833 | 6/2006 |
| WO | WO9904568 | 1/1999 |

(Continued)

OTHER PUBLICATIONS

Foote, "An Overview of Audio Information Retrieval," Multimedia Systems, v.7 n.I, p. 2-10, Jan. 1999.

(Continued)

*Primary Examiner* — Frantz Jean
(74) *Attorney, Agent, or Firm* — Digimarc Corporation

(57) ABSTRACT

The disclosure relates to accessing computer resources by sensing audio with a microphone. One claim recites a method comprising: obtaining data in a first user's cell phone, the data corresponding to microphone-captured audio; responsive to the data, the first user's cell phone receiving a service provided by a first party, the service comprising facilitating access to a computer resource over a network; in which the first user does not provide a fee to the first party for the service, as the first party bills a charge connected with the service to a sponsoring party. Of course, other claims and combinations are provided as well.

29 Claims, 2 Drawing Sheets

(56) References Cited

U.S. PATENT DOCUMENTS

| | | | |
|---|---|---|---|
| 6,121,530 A | 9/2000 | Sonoda | |
| 6,188,010 B1 | 2/2001 | Iwamura | |
| 6,243,450 B1* | 6/2001 | Jansen et al. | 379/144.01 |
| 6,477,509 B1 | 11/2002 | Hammons et al. | |
| 6,505,160 B1 | 1/2003 | Levy et al. | |
| 6,571,216 B1 | 5/2003 | Garg et al. | |
| 6,584,492 B1 | 6/2003 | Cezar et al. | |
| 6,614,914 B1 | 9/2003 | Rhoads et al. | |
| 6,684,249 B1 | 1/2004 | Frerichs | |
| 6,769,010 B1 | 7/2004 | Knapp et al. | |
| 6,834,308 B1 | 12/2004 | Ikezoye et al. | |
| 6,892,181 B1 | 5/2005 | Megiddo et al. | |
| 6,892,354 B1 | 5/2005 | Servan-Schreiber et al. | |
| 6,907,566 B1 | 6/2005 | McElfresh et al. | |
| 6,941,275 B1 | 9/2005 | Swierczek | |
| 6,947,571 B1 | 9/2005 | Rhoads et al. | |
| 7,251,475 B2 | 7/2007 | Kawamoto | |
| 7,346,545 B2 | 3/2008 | Jones | |
| 7,359,889 B2 | 4/2008 | Wang | |
| 7,444,353 B1 | 10/2008 | Chen | |
| 7,467,348 B1 | 12/2008 | Taylor et al. | |
| 8,094,949 B1 | 1/2012 | Rhoads | |
| 8,417,793 B2 | 4/2013 | Davis et al. | |
| 2001/0037205 A1 | 11/2001 | Joao | |
| 2001/0056573 A1 | 12/2001 | Kovac | |
| 2002/0004735 A1 | 1/2002 | Gross | |
| 2002/0075298 A1* | 6/2002 | Schena et al. | 345/738 |
| 2002/0167406 A1* | 11/2002 | Garber et al. | 340/572.7 |
| 2006/0288072 A1* | 12/2006 | Knapp et al. | 709/203 |
| 2013/0295878 A1 | 11/2013 | Davis | |

FOREIGN PATENT DOCUMENTS

| | | |
|---|---|---|
| WO | WO0070585 | 11/2000 |
| WO | WO0211123 | 2/2002 |
| WO | WO0227600 | 4/2002 |

OTHER PUBLICATIONS

Ghias et al, Query by Humming: Musical Information Retrieval in an Audio Database. In ACM Multimedia, pp. 231-236, Nov. 1995.

U.S. Appl. No. 60/134,782, filed May 19, 1999.

* cited by examiner

METHOD, CELL PHONE AND SYSTEM FOR ACCESSING A COMPUTER RESOURCE OVER A NETWORK VIA MICROPHONE-CAPTURED AUDIO

RELATED APPLICATION DATA

This application is a continuation of U.S. patent application Ser. No. 13/856,161, filed Apr. 3, 2013, which is a continuation of U.S. patent application Ser. No. 11/382,427, filed May 9, 2006 (now U.S. Pat. No. 8,417,793), which is a continuation of application Ser. No. 09/697,780, filed Oct. 26, 2000 (now abandoned).

The subject matter of the present application is also related to that disclosed in application Ser. No. 09/571,422, filed May 15, 2000 (now U.S. Pat. No. 6,947,571).

FIELD OF THE INVENTION

The present invention relates to non-traditional methods of providing internet access.

BACKGROUND AND INTRODUCTION

Internet access is becoming ubiquitous. Home, office, and school are no longer the only sites from which users gain access. Increasingly, internet access can also be obtained from terminals at airport kiosks, coffee shops, photocopy centers, city halls, and other non-traditional sites ("public sites").

When accessing the internet from such public sites, users may be required to utilize an Internet Service Provider (ISP) associated with that terminal, or they may be given the option of signing-on using the customary ISP they use at home or work. In either case, a fee is typically charged for such public access.

In accordance with one aspect of the present disclosure, costs associated with accessing the internet from a public site are borne by one or more sponsors. The internet terminal thus sponsored may, in exchange, be limited in the internet domains it is capable of browsing. For example, if the terminal is sponsored by an automobile manufacturer, the terminal may be limited to browsing that manufacturer's web pages. Browsing of certain other domains may also be permitted (for example, the web pages at the weather.com and cnn.com domains). But browsing of web sites associated with competitors of the sponsor may be restricted.

Some such terminals are equipped with optical input devices, such as web cams, permitting users to present physical objects to the device (e.g., magazine advertisements or product packaging), and be linked to corresponding web pages. Such arrangements are further detailed in the cited '422 application; such optically-based linking services are offered by the present assignee under the Digimarc MediaBridge service mark.

According to another aspect of the disclosure, web cards (like pre-paid phone cards) may be sold at retail establishments (or issued by libraries), to permit web browsing from compliant terminals. The cards may have fixed or programmable restrictions, e.g., preventing browsing of adult content web sites.

The foregoing and additional features and advantages of the present technology will be more readily apparent from the following detailed description.

DETAILED DESCRIPTION

Figure 1:
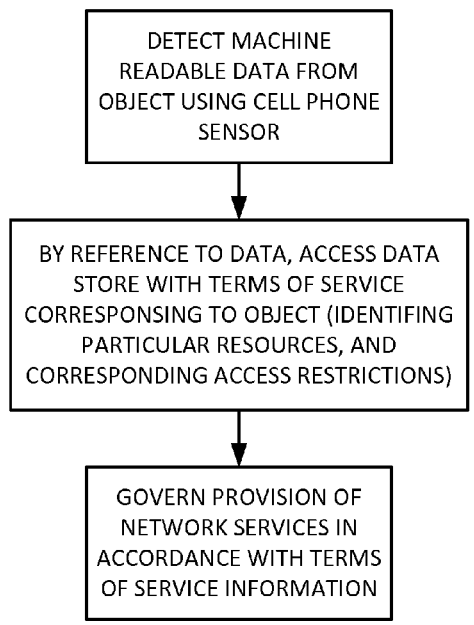
FIGS. 1-4 are flow charts illustrating certain embodiments of the technology.

An internet terminal according to one embodiment of the present disclosure is a kiosk in an airport terminal. Persons awaiting flights can utilize the terminal to browse internet domains authorized by a sponsor of the unit. For example, if the kiosk is sponsored by Ford Motor Company, the user may be permitted to browse URLs associated with the root domains ford.com, jaguar.com, and volvo.com (i.e., Ford brands). Additionally, browsing of certain non-Ford sites may be sponsored by Ford simply to generate customer goodwill.

The internet connectivity associated with such a terminal may be provided by an ISP that bills Ford a monthly fee. Ford may also pay any telephone line charge or floor space rent associated with such a device. Alternatively, a third party may own and operate the terminal—paying the associated ISP and telephone fees, rent, etc.—and then make the terminal available for Ford's sponsorship in exchange for a fee. The fee can be a set amount per month, or can be related to the volume of usage. Usage models can take various forms. One charges Ford a set amount per minute of actual customer usage. Another charges a set amount each time a link is made to a sponsored (e.g., ford.com) web site. Another charges a set amount for each "user session" (which may be defined as a period of user activity followed by at least two minutes of inactivity). If the sponsored web sites provide opportunities for e-commerce, then a fraction of each sale made through the terminal can be provided to the third party (typically in addition to other fees). A number of other payment arrangements, of course, can be devised.

In some embodiments, the kiosk can be used to browse non-sponsored domains, but at a charge to the user. Thus, if the user attempts to access a URL at the chevrolet.com root domain, the kiosk may solicit a user credit card number to which a time-based access fee can be charged. The fee can be connect-time based (e.g., $1.00 for the first five minutes, and ten cents a minute thereafter); it may vary in accordance with the time of day (e.g., charging a premium rate during high traffic hours), etc.

In addition to use in public places like airports, such terminals can also be used in retail establishments. For example, such a kiosk may be provided in the cosmetics section of a department store. The kiosk may be equipped with a web cam to which customers can present product literature or packaging. The kiosk may be programmed to sense machine-readable data from such literature or packaging (e.g., in the form of digital watermarks) and, based on such data, link to web addresses corresponding to such objects. Again, the kiosk may be arranged to provide such linking free of charge from certain objects (e.g., Revlon products, which lead to web pages at the revlon.com root domain), while providing no linking (or fee-based linking) to other web destinations. Different faces of the product packaging may be encoded with different data, triggering different responses (e.g., different web destinations).

Once a user accesses a first sponsored web page from such a terminal, navigation to second and subsequent web pages may be effected by clicking on hyperlinks on the usual manner (e.g., with a mouse or other pointing device associated with such terminal). In the case just given, if the second web page is also sponsored, then continued no-charge access is provided. However, if the customer attempts to link to a web site associated with a root domain that has not been authorized for no-charge browsing, then the customer may be prompted to enter charge card information, or be blocked from such further browsing.

As detailed in the cited '422 application, linking from objects to corresponding web destinations can be effected by encoding a URL address directly into the machine-readable data sensed from the printed literature or packaging. More commonly, however, the object is encoded with an identifier that is used to access a corresponding URL address stored in a database or other data structure. The database may be remote from the kiosk (e.g., the Digimarc MediaBridge database). In some embodiments, the provider of a remote database receives a usage fee from the kiosk sponsor each time the database is consulted in linking from an object to a sponsored web address. Other compensation arrangements for the database provider, like those payment arrangements discussed earlier, can also be provided.

As noted, the internet terminal may permit access to computer addresses associated with one or more root domains. The authorized domain(s) can be listed in a data record stored in non-volatile storage within the terminal, or at a remote location. (Alternatively, the list can specify domains to which no-charge browsing is not to be permitted, with no-charge browsing permitted to all non-specified domains.) Storing such a list at a remote location allows large systems of such terminals, distributed over wide geographic areas, to utilize a shared list—facilitating administration.

One way of implementing such a shared list is to utilize the same remote system that provides the object identifier-to-URL lookup services. All terminals can route through a proxy server at the remote system that enforces browsing based on the identity of the terminal device which sent the request for a URL. Another approach employs a local proxy server at the terminal, which receives lists of permitted (or forbidden) domains from the remote system. Relatedly, a custom browser can be employed at the terminal that performs domain checking based on information received from the remote system (e.g., employing the standard Windows Inet control). A browser extension can also be employed to manage browsable sites.

Considering the first such approach in more detail, the Digimarc MediaBridge database (that is used to provide URLs corresponding to encoded object identifiers) is also used to specify the internet domains to which no-charge access is to be provided. In such case, the data exchanged between terminal and database (e.g., as detailed in the '422 application) includes data identifying the terminal. The terminal identification data can take various forms. For example, the data can uniquely identify the terminal (e.g., by serial number). Or it can identify the terminal as a member of a class of terminals without uniquely identifying a particular terminal (e.g., CNN Airport News terminals, Kinkos terminals, McDonalds terminals, Qwest terminals, Delta Airlines terminals). Etc. Based on the terminal identification data, the Digimarc MediaBridge database can consult a corresponding data record to determine the root domains to which no-charge browsing from that terminal should be permitted. The data passed back to the terminal can indicate whether a requested link should be provided free of charge.

In some such embodiments, the database evaluates every user-requested link, and signals to the originating terminal, accordingly, whether free access is to be provided. A terminal can cache such information locally for predetermined periods to permit faster evaluation of certain links. For example, if a first customer presents a Revlon lipstick to a kiosk, and the database responds by informing the kiosk that a link to a web site at the revlon.com root domain is to be permitted on a no-charge basis, then this information may be cached for a predetermined period. Thereafter, if a second customer presents the same product to the kiosk, the kiosk first checks the cache. Finding that no-charge linking was earlier permitted from such product, then no-charge linking can be permitted again—without the need to consult the database. (The same cache-based operation can allow free linking from all Revlon products if the products can be locally identified as corresponding to the Revlon root domain, e.g., by caching earlier-determined identifier-to-URL correspondences.)

Another approach to limiting browsing does not rely on identification of the terminal used. Instead, the object identifier with which an object is encoded can point to a record in the Digimarc MediaBridge database that—in addition to identifying the corresponding URL—also specifies further navigation privileges that can be undertaken from within the browser window it launches. Thus, the restriction on browsing can be triggered by the object presented to the computer, rather than whether the computer is a public terminal or a home PC.

The determination whether to provide no-charge internet navigation can be triggered by factors other than the domain to which navigation is requested. For example, an airport internet kiosk can include a 2D optical sensor that images an ID or membership card presented by a user, and extracts machine-readable information from the resulting image data. If, for example, a user presents an Alaska Airlines Platinum VISA credit card, then free access may be permitted. If the user presents an Alaska Airlines MVP membership card, then browsing at a discounted charge may be permitted. If a user presents no card, or a card for which special privileges are not granted, then browsing at full-rate charges may be permitted. (Marking of cards with optically-readable information can be achieved in various ways, e.g., by digital watermarks. Digital watermarking techniques are well known; exemplary techniques are detailed in the present assignee's U.S. Pat. No. 5,862,260 and in application Ser. No. 09/503,881 (now U.S. Pat. No. 6,614,914).) In other such embodiments, optical sensing is not required, and may be replaced by other verification techniques (e.g., mag stripe reading, RF ID, smart card technology, etc.). Although it is possible to permit users simply to type membership numbers at a terminal in order to receive privileged access, such approach may encourage unauthorized sharing of such numbers among users.

More generally, different cards (or other credentials) can be used to enable different classes of internet access. While credit cards, debit card, etc. are used today to obtain internet access, many people do not have such cards (e.g., juveniles). Cards like pre-paid phone cards can be distributed (e.g., sold) to provide internet access from public sites.

One such card may be an Unlimited Net Card, which works everywhere. The card may be unrestricted in its browsing, or restrictions specified by the issuer or the purchaser may be enforced. Restrictions by the user may be specified at the time of purchase (e.g., language/nudity/sex/violence, per RSACi standards), encoded on the card as part of the issuance procedure, and thereafter recognized/respected by the terminal. Or other means can be employed. For example, the first time the card is used, the terminal may be directed to a setup/home page where the user can specify parameters of use. Restrictions on browsing can be specified, e.g., by RSACi or other known internet rating/filtering systems and services. Or browsing can be restricted to certain specified domains entered by the user. Or browsing can be forbidden on certain domains specified by the user. Or combinations of these and other parameters can be employed. All such parameters can then be stored in a card profile record stored in a central database, which is consulted by public terminals each time the card is thereafter used.

Another such card is a Kid Card, which works everywhere, but is content restricted (e.g., as detailed above) per one of several pre-established profiles (e.g., tailored for different age ranges). A feature of the Kid Card is that a tracking report of sites visited may be maintained and provided, via e-mail, to a parent/guardian associated with the card. The parent/guardian email can be specified at time of purchase, or via a setup screen the first time the card is used to access the internet. The email tracking report can be provided on-demand (e.g., by sending an email from the designated email address to a predetermined service), periodically (e.g., weekly), when the card is used-up, etc. Such cards may be issued without charge by libraries, with parental consent, to permit use of library terminals that are not, themselves, content restricted.

Another card is a Sponsored Card, which may provide no-charge access only to certain domains. Such cards may be particularly well suited for issuance by merchants in conjunction with promotions, contests, in store couponing programs, etc. Typically, although not necessarily, such cards are issued free of charge, and may not be exhausted by usage or time.

All such cards may be issued, or backed, by a financial institution—such as a bank or credit card company, but need not be so. When used up, a card can be discarded and a new card bought, or known means can be provided to replenish the card with additional credit. The card typically is issued in fixed increments specified, e.g., in dollars or minutes of access time. Such cards may be distributed in much the same way as prepaid phone cards are now, e.g., from grocery and convenience store checkouts, from vending machines, etc.

In the foregoing discussion of "cards," other credentials can readily be substituted—both physical and electronic (virtual). An example of the latter is a PIN number that, when purchased, entitles to the buyer to 100 minutes of internet access. (The user may provide the PIN number to the terminal in known ways, e.g., by keypad entry, etc.)

Figure 2:
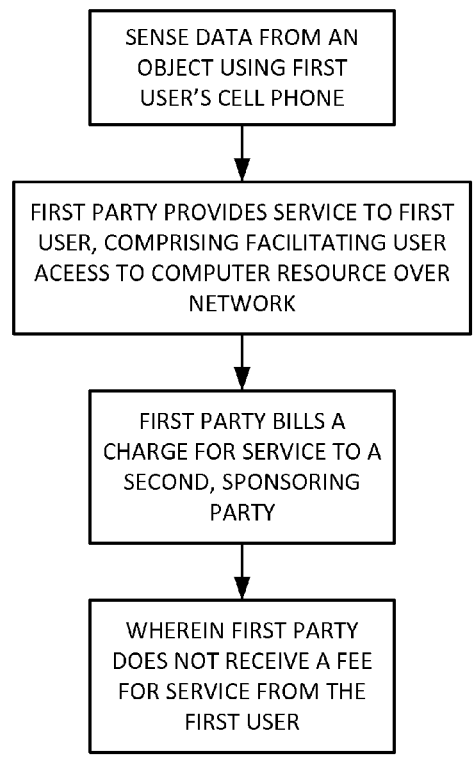
Figure 3:
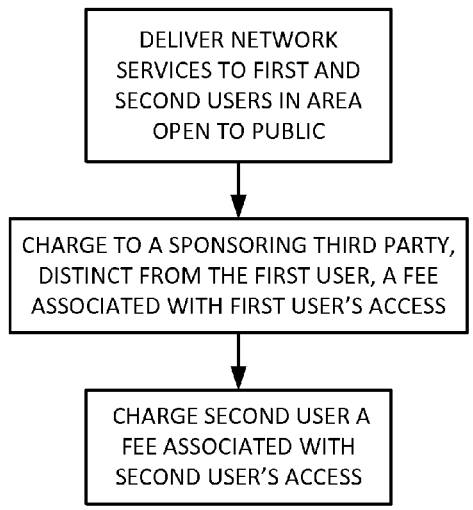
Figure 4:
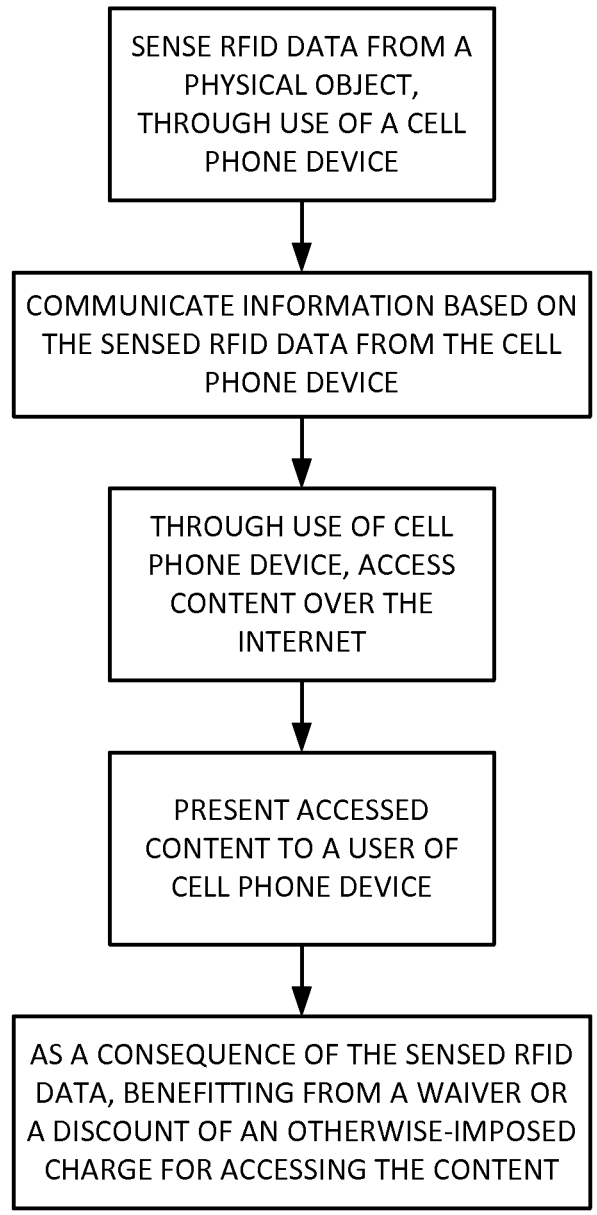

Certain of the methods detailed herein are illustrated by the flowcharts of FIGS. 1-4.

To provide a comprehensive disclosure without unduly lengthening this specification, the patents and applications cited above are incorporated herein by reference.

Having described and illustrated the principles of the technology with reference to illustrative embodiments, it should be recognized that the invention is not so limited.

For example, while the detailed description focused on usage of terminals in public places, the invention is not so limited. The same methods can be employed at home or at other traditional sites, with the cost of access for a session being borne by a promoter rather than the user.

While the preferred embodiment employed digital watermarking in conveying data from physical objects to optical sensors, other machine-readable data representations can be used instead (e.g., bar codes, glyphs, RF IDs, mag stripes, smart card technology, etc.).

Still further, while the preferred embodiments generally operate by using an object identifier to access a corresponding database record, and from such record determining a corresponding URL, in other embodiments this need not be the case. Instead, the URL can be directly encoded on the object.

While most of the above-detailed embodiments contemplated that web navigation would be effected by optical sensing of objects presented to the internet terminal, or by clicking on hyperlinks from displayed web pages, other navigation techniques can of course be used, e.g., typing-in a URL, selecting from a list of stored Favorites sites, clicking on GUI buttons, etc. Moreover, while audio prompting has not been detailed, such techniques can be employed to facilitate user interaction with the terminal.

U.S. Pat. No. 6,947,571 includes the following text:

From Col. 45, lines 36-51: "Cell phones are already equipped with numerous features that make them well suited for Bedoop operation. One is that cell phones typically include an LCD or similar screen for display of textual or graphic information, and additionally include buttons or other controls for selecting among menu options presented on the screen (e.g., by moving a cursor). Moreover, cell phones naturally include both audio input and output devices (i.e., microphone and speaker). Still further, the protocol by which cell phones transmit data includes data identifying the phone, so that such data need not be separately encoded. And finally, cell phones obviously provide ready links to remote computer systems. Collectively, these capabilities rival those of the most fully-equipped desktop computer system. Thus, essentially all of the applications detailed elsewhere in this specification can be implemented using cell phone Bedoop systems."

From Col. 64, lines 19-47: "Still another application is the sale or promotion of music or video over the internet. Taking the case of music, an artist may freely distribute a low-fidelity (or otherwise corrupted or abridged) version of a song. The low fidelity can be by reason of bandwidth limitation (e.g., 500 Hz-2.5 KHz), monophonic (as opposed to stereo), or otherwise. The artist can seek to distribute the low-fidelity version as widely as possible, to serve as a marketing agent for the artist's other works. (The free distribution of lower-bandwidth audio may serve to alleviate some of the network bandwidth problems faced by universities whose students actively engage in transferring free music over the internet) Each low-fidelity version can be processed to extract an identifier (e.g., a steganographic in-band watermark; a numeric ID or song/artist name field in a in a file header, a 128-bit hash value obtained by applying a hashing algorithm to the music data, the music file header data, a portion thereof, etc.) If a listener is interested in obtaining a full-fidelity version of the work, the listener can operate a suitably programmed computer or music appliance that extracts the identifier from the work and passes it on to the remote system. The remote system can respond in various ways, e.g., by providing a full-fidelity version of the same work back to the user (such as MP3 download) and charge the user's credit card a fee (e.g., $0.99); or by directing a web browser on the user's computer to an e-commerce/fan web site associated with the music, etc. Such functionality can be provided in general purpose programs such as Microsoft's Internet Explorer, e.g., by right-clicking on a file to obtain a menu that includes this and related functions."

From Col. 66, lines 36-51: "For example, an application 28 can "capture" music or other audio using a recording device (note recorder, microphone connected to PC, MP3 player, etc.). and analyze the captured audio to detect an embedded watermark. Once detected, the application passes some or all of the watermark payload information, together with identification of the application and its vendor, to the router. The router forwards the payload information to a handler corresponding to the application. The response of the product handler varies with the context and nature of the data. For example, the handler may return the artist, title, track, album, web URL and purchasing information, to the user. Recorded news and entertainment segments may include transcripts (audio, video and/or text) of the segment along with other related web site information. The handler may simply cause the device 12 to launch a browser window directed to a music commerce web site where the music can be purchased."

From Col. 49, lines 32-47: "When used with nonelectronic objects, device 12 (FIG. 2) typically includes some form of sensor or transducer 22 to produce electronic signals or data corresponding to the object. Examples include CCD- or CMOS-based optical sensors (either as part of still- or video cameras, flatbed scanners, mice, or otherwise), microphones, barcode scanners, RF ID sensors, mag stripe readers, etc. In such cases, the sensor 22 may be coupled to associated interface electronics 24, which in turn may be coupled to device driver software 26, which in turn may be coupled to one or more application programs 28. Device driver software 26 serves as a software interface, communicating at a relatively high level with the application programs 28 (e.g., through API instructions whose content and format are standardized to facilitate application programming), and at a relatively low level with the interface electronics 24."

From Col. 2, lines 9-14: "Nor, as will be apparent, is the technology limited to systems employing optical input and encoded imagery. Corresponding techniques can also be employed with encoded audio. Indeed, any physical or electronic "object" can make use of the principles detailed herein."

The reference to internet terminals in the foregoing discussion should not be taken as limiting applicability of the invention to any particular form of hardware (e.g., desktop computers or kiosks). Any internet-enabled device or appliance can utilize the principles detailed herein, including cell phones and other wireless devices, personal digital assistants, web-enabled entertainment appliances, etc., etc. Moreover, while full-time internet access by such devices is preferred, the same principles can be employed in other applications, e.g., in which product identifiers are cached when internet access is not available, and utilized (e.g., sent) when access is thereafter provided.

The implementation of the functionality described above (including watermark decoding) is straightforward to artisans in the field, and thus not further belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

To review, one aspect of the present technology comprises a method of accessing a web page from a publicly accessible internet device that includes: presenting an object to the device, sensing the object with an optical sensor, and decoding data produced by said optical sensor to yield an object identifier. A first data structure is then consulted to determine whether a web page corresponding to the object identifier is among those sponsored by a third party, so that user access to such web page is permitted without charge. If so, linking to the web page is undertaken. This linking includes consulting a second data structure to identify a web address corresponding to the object identifier, and directing a web browser to that address. Certain costs associated with providing this no-charge user linking to such sponsored web page is funded by periodically charging the third party therefor. If the web page is not among those sponsored by the third party, the method includes soliciting payment information from a user before linking to that web page.

Another aspect of the technology comprises a method of accessing a networked resource from a device that includes: presenting a physical object to an optical sensor associated with the device, decoding an identifier encoded on the physical object from data produced by said optical sensor, determining whether free user access to a computer address related to said identifier is to be permitted, and, if so, linking said device to that computer address.

Still another aspect of the present technology comprises a method of operating an internet access device located in a public place, which includes: sensing a credential presented by a user; if the credential is of a first class, permitting internet access at a first rate structure; if the credential is of a second class, permitting internet access at a second rate structure; and if the credential is of a third class, permitting internet access at a third rate structure.

Yet a further aspect of the technology involves selling an internet access card at a retail establishment or vending machine, where the card has a stored value associated therewith; detecting the card at an internet access device; and providing internet browsing services, and debiting the stored value associated with the card in accordance with the extent of such browsing.

Still another aspect of the present technology comprises a card for distribution to juveniles to permit internet browsing at internet browsing devices, where the card has associated with it a restriction that limits browsing of web sites presenting adult content.

It should be recognized that the particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

I claim:
1. A method comprising:
  obtaining data representing audio in a first user's cell phone, the data representing audio corresponding to microphone-captured audio;
  responsive to extraction of information from the data representing audio, and successful indexing of the information in a remotely located repository, the first user's cell phone receiving a service provided by a first party, the service comprising facilitating access to a computer resource over a network;
  in which the first user does not provide a fee to the first party for the service, as a sponsoring party receives a charge associated with the service.
2. The method of claim 1 in which the computer resource comprises a music commerce service through which music corresponding to the microphone-captured audio can be purchased.
3. The method of claim 1 in which the service is provided to the first user in response to the data being of a certain class.
4. The method of claim 1 wherein the computer resource serves to promote a product or service offered by the sponsoring party.
5. The method of claim 1 wherein the service comprises linking to a computer resource identified by using the information.
6. The method of claim 1 in which the information comprises digital watermarking.

7. The method of claim 1 in which the information is obtained through processing the microphone-captured audio to extract information therefrom.

8. The method of claim 1 in which the information is extracted by applying a hashing algorithm to the data representing audio.

9. The method of claim 1 in which the charge is based on the first user linking to the computer resource.

10. The method of claim 1 in which the computer resource provides opportunities for e-commerce, and the charge comprises a portion of a music sale associated with the microphone-captured audio.

11. A non-transitory machine readable medium comprising instructions stored thereon to cause a processor to perform the method of claim 1.

12. A non-transitory machine readable medium comprising instructions stored thereon to cause a processor to perform the method of claim 8.

13. A cell phone comprising:
a microphone for capturing audio;
memory for storing software instructions; and
a processor programmed with the software instructions for:
- extracting data from captured audio by applying a hashing algorithm to the captured audio;
- providing the data to a remote location;
- responsive to providing the data, interacting with a service provided by a first party, the service comprising facilitating access to a computer resource over a network; in which a user associated with the cell phone does not provide a fee to the first party for the service, as a sponsoring party receives a charge associated with the service.

14. The cell phone of claim 13 in which in which the computer resource comprises a music commerce service through which music can be purchased.

15. The cell phone of claim 13 wherein the service is provided to the first user in response to the data being of a certain class.

16. The cell phone of claim 13 wherein the computer resource serves to promote a product or service offered by the sponsoring party.

17. The cell phone of claim 13 wherein the service comprises linking to a computer resource identified by reference to the data.

18. The cell phone of claim 13 in which the charge is based on the first user linking to the computer resource.

19. The cell phone of claim 13 in which the computer resource provides opportunities for e-commerce, and the charge comprises a portion of a music sale associated with the captured audio.

20. A system comprising:
a mobile device programmed for: i) obtaining data corresponding to microphone-captured audio, and ii) providing the data;
a network resource operated by a first party, which—responsive to receipt of the data—is configured to provide a service to the mobile device, the service comprising facilitating access to a computer resource over a network;
in which the first party does not charge a fee to a user associated with the mobile device for the service, but instead bills a charge connected with the service to a sponsoring party.

21. The system of claim 20 in which the computer resource comprises a music commerce service through which music can be purchased.

22. The system of claim 20 in which the service is provided to the mobile device in response to the data being of a certain class.

23. The system of claim 20 in which the data comprises digital watermark information.

24. The system of claim 20 in which the data is obtained through processing the microphone-captured audio to extract information therefrom.

25. The system of claim 24 in which the information is extracted by applying a hashing algorithm to the data.

26. The system of claim 20 in which the charge is based on the mobile device linking to the computer resource.

27. The system of claim 26 in which the computer resource provides opportunities for e-commerce, and the charge comprises a portion of a music sale associated with the microphone captured audio.

28. The system of claim 20 in which the mobile device comprises a cell phone, and the network resource comprise a computer server.

29. The system of claim 20 in which the network resource processes the data to extract identifying information therefrom.

* * * * *